United States Patent [19]
Tang

[11] 4,244,476
[45] Jan. 13, 1981

[54] RACKING

[75] Inventor: Alexander R. Tang, High Wycombe, England

[73] Assignee: Acrow (Automation) Limited, Middlesex, England

[21] Appl. No.: 52,487

[22] Filed: Jun. 27, 1979

[51] Int. Cl.³ .............................................. A47F 5/00
[52] U.S. Cl. .................................. 211/192; 403/317; 403/DIG. 1
[58] Field of Search ................. 211/189, 192; 403/254, 403/317, 316, 319, DIG. 1

[56] References Cited
U.S. PATENT DOCUMENTS

| | | | |
|---|---|---|---|
| 3,240,352 | 3/1966 | Baker | 211/192 |
| 3,575,299 | 4/1971 | O'Dette | 211/192 |
| 4,165,944 | 8/1979 | Sunasky | 211/192 X |

Primary Examiner—Roy D. Frazier
Assistant Examiner—Robert W. Gibson, Jr.
Attorney, Agent, or Firm—Wood, Herron & Evans

[57] ABSTRACT

Locking means for racking of the type comprising metal uprights having sockets, e.g. pressed out of a web portion, and beams the ends of which are provided with hooks to engage in the sockets of the upright. The locking means comprises a magnet which is attached to the metal upright and positioned between a stop on the metal upright and an abutment surface on a beam to prevent upward movement of the beam and disengagement of the hooks.

11 Claims, 4 Drawing Figures

RACKING

The present invention relates to racking particularly racking for storing goods of the type which is built from metal uprights in which are formed sockets and beams at the end of which are hooks which engage in the sockets.

It is known that racking of this type which is designed so that the beams can be assembled and disassembled from the upright, can be inadvertently disassembled by a fork lift truck catching the underside of a beam and lifting the beam so that the hooks are disengaged from the sockets. In order to avoid this, various proposals have been made such as providing a springing clip on one of the hooks which engages on the underside of a socket providing a projection on the upper side of the hook which springs into engagement with the underside of a socket, or by providing a pin or bolt between the beam and upright. The problem with the clip and projection arrangement is that positive indication of their being in locking engagement may be lacking. Whilst the pin or bolt arrangements may be unsatisfactory because the pins can drop out and bolts are tedious to fasten.

The invention has been made with the above points in mind.

According to the present invention there is provided racking of the type comprising metal uprights in which are formed sockets and beams at the ends of which are hooks which engage in the sockets in which at least one locking member is magnetically held in place against a metal upright, the locking member being shaped and positioned whereby it may bear against a stop on the metal upright and against a beam when the hooks of the beam are engaged in the sockets in the metal upright to prevent removal of the hooks from the socket.

The invention provides a simple and effective system for preventing the accidental displacement of a beam from an upright. A locking member is magnetically held in place on the upright between a stop and the beam so that any upward forces on the beam cause the beam to abut the locking member which in turn abuts the stop preventing disengagement of the hooks from the sockets. The locking member may be simply placed in position after assembly of the uprights and beams without need for clips and bolts and is magnetically retained firmly in place against the upright.

Each socket in the metal upright is preferably formed by pressing out a portion of the central web of the upright to provide a louvre having a flat face spaced from the plane of the web and overlying a socket aperture from which the flat face portion has been removed. The lower edge of the louvre may act as the stop providing an abutment surface against which part of the locking member may bear.

Preferably one or more of the hooks at the ends of the beam are provided with an abutment surface on their upper side for contact with the locking member. Thus the locking member may conveniently be positioned on an upright in the space beneath a louvre forming a socket and above the hook of a beam which is engaged in the socket beneath.

According to one embodiment of the invention the locking member is a bar magnet having its poles at each end of the bar of suitable size and shape to be positioned between the stop and the beam, e.g. the louvre and the top of a hook. Preferably the magnet substantially fills the space between the beam and the stop so that minimal upward movement of the beam is allowed.

A second type of locking member is a magnet having the same size and shape characteristics as described above but one in which the poles of the magnet are constituted at the major surfaces. Thus all the surface of the magnet in contact with the upright is a pole and therefore there is strong uniform attraction to the upright over the whole area of contact.

A preferred locking member is a so-called "pot-magnet". A "pot-magnet" comprises a magnet as described above having its poles at the major surfaces which is shrouded over all but one major surface with a metal susceptible to magnetism. The metal shrouding becomes a pole piece for the covered pole and therefore the edge of the shrouding forming the perimeter around the unshrouded major surface acts as a pole having the same polarity as the covered major surface, i.e. both poles are concentrated at the same surface. The attraction to metal of the unshrouded surface of the pot-magnet is significantly increased compared to the magnet without shrouding and therefore the pot-magnet will adhere firmly in place against the metal upright.

The exact shape of the locking member is not critical providing it has the necessary surfaces to abut the stop and beam. Conveniently the locking member may take the form of a block or bar. Preferably the edges of the major surface of the block not intended to contact the upright are radiused or chamfered to reduce the possibility of accidental displacement. In this way a positive effort is required for removal of the locking member.

Preferably the locking member is provided with a pin projecting from the surface intended to contact the upright and the upright is provided with an aperture to accommodate the pin. This arrangement prevents horizontal displacement of the locking member, e.g. by knocking the locking member, and is particularly advantageous when used on an upright at the end of racking since the locking member will not have beams on each side. The pin is preferably made of a material not susceptible to magnetism, e.g. a plastics material. The pin is conveniently of a length such that it passes through the aperture of the upright and projects through the other side so that the locking member may be removed by pressing the pin. This is particularly advantageous when the locking member has chamfered edges and it is difficult to obtain a purchase on the locking member sufficient to overcome the magnetic attraction to the metal upright.

The invention will now be described by way of example with reference to the accompanying drawings, in which.

Figure 1:
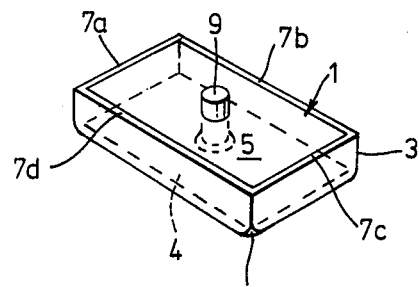
FIG. 1 represents a locking member suitable for use in the invention.

The locking member 1 shown in FIG. 1 is a pot-magnet comprising a magnet 2 having its poles at the major surfaces (4 and 5) and a metallic shroud 3. The shroud effectively transfers the pole 4 of the magnet to the perimeter regions 7a to 7d surrounding the pole 5. The locking member also includes a pin 9 to be inserted in an aperture in the upright. The edges 11 of the locking member are radiused.

Figure 3:
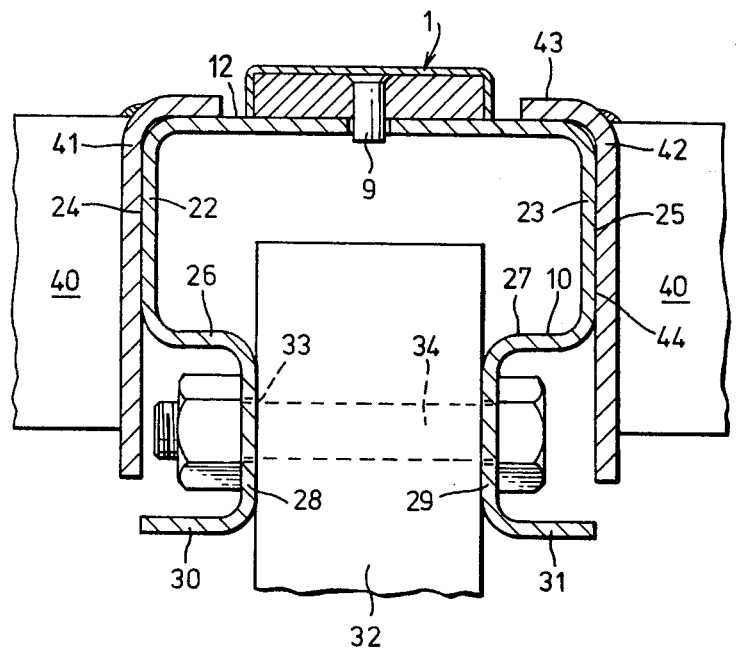
FIG. 3 represents a section taken along the line A—A in FIG. 2.
Figure 2:
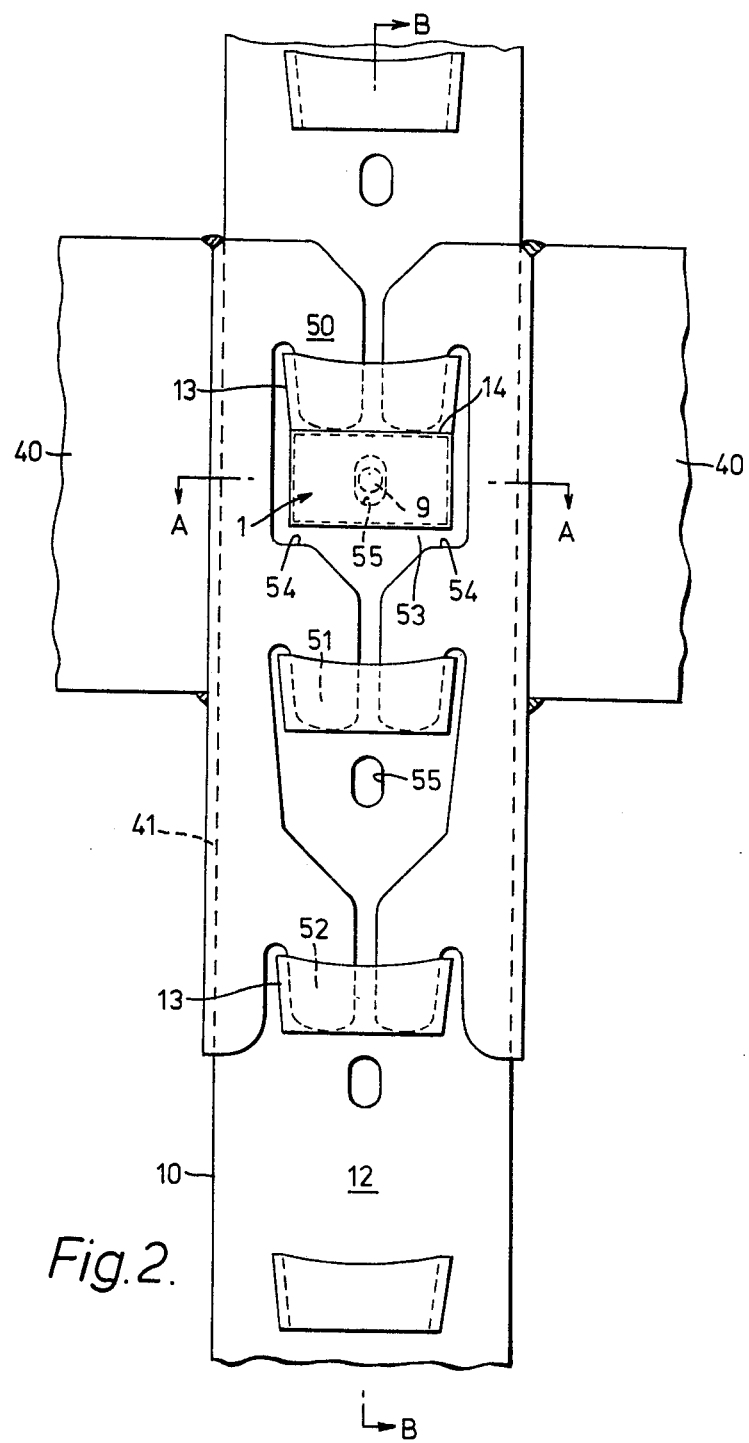
FIG. 2 represents a front elevation of racking in accordance with the invention.
Figure 4:
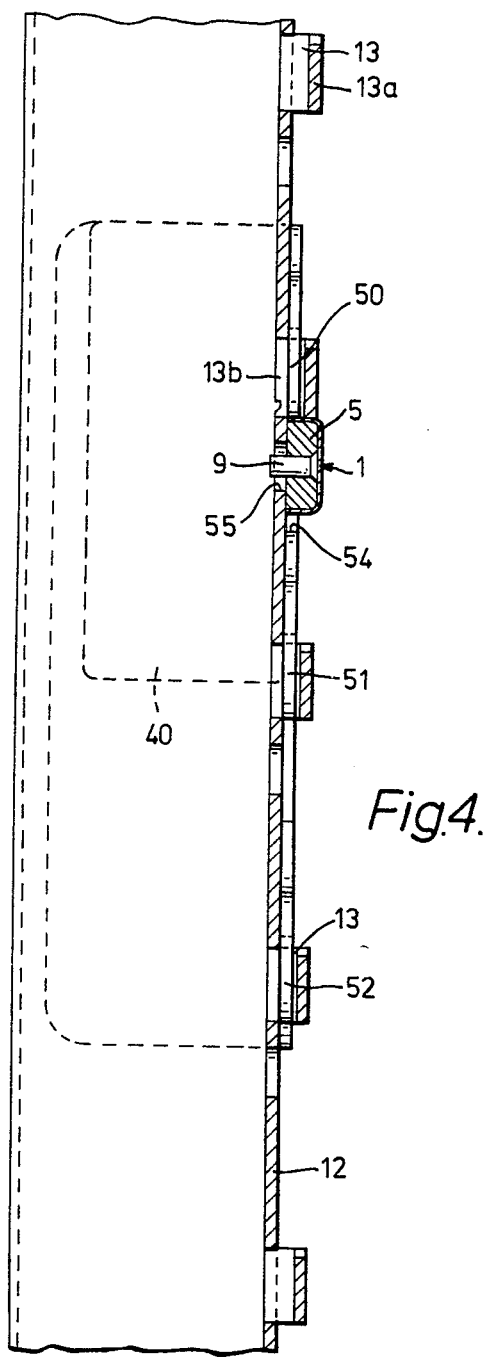
FIG. 4 represents a section taken along the line B—B in FIG. 2.

The racking shown in FIGS. 2 to 4 includes a metal upright 10 comprising a central web 12 in which sockets 13 are spaced at regular equal intervals. Each socket is formed by pressing out a portion 13a of the central web 12 to provide a louvre having a flat face spaced from the plane of the web and overlying a socket aperture 13b from which the front face portion has been removed. The lower surface 14 of the socket louvre provides an abutment surface constituting a stop.

Either side of the central web 12 as seen in FIG. 3 are flanking webs 22 and 23 at right angles to the central web which have outer abutment surfaces 24 and 25. Extending at right angles from the flanking webs 22 and 23 are connecting webs 26 and 27, at right angles to the connecting webs are bolting webs 28 and 29 and terminal webs 30 and 31 which extend from the bolting webs in a common plane parallel to the plane of the central web 12. The bolting webs have holes 33 formed at intervals so that interconnecting members, one of which members 32 is shown in FIG. 3, can be located between the bolting webs of opposed uprights and bolted therebetween by bolts 34. The holes 33 can also be used to secure bracing members (not shown) which can be fitted diagonally between uprights. Alternatively the members 32 may be welded to the webs 28.

The beams 40 are each provided at least at one end and generally at both ends with a bracket 42 having two arms 42 and 43 (FIG. 3) at right angles to each other. The first arm 42 is welded onto an end of the beam 30 and has an abutment surface 44 which is designed to lie in abutting contact with abutment surface 24 or 25 of flanking webs 22 and 23 of the upright. The second arms 43 when fitted to the upright lie against the central web 12 and have three downwardly facing hooks 50, 51 and 52 each of which fit into sockets 13. The number of hooks on the end of a beam is not critical although generally there are two or more depending upon the size of the beams. A gap 53 is formed between the abutment surface 14 of the louvre and the hooks 51 provides the space for fitting the locking member 1. The hooks 51 have an upper abutment surface 54 on their upper side defining parts of the extremity of the gap 53 which together with lower abutment surface 14 of louvres form limits against which the locking member acts as will be described.

To assemble the racking uprights 12 are erected with, if necessary, interconnecting members 32 and beams 40 are then offerred to the uprights and hooks 50, 51 and 52 inserted in sockets 13 at a selected height. The beams are then tapped down so that the hooks and sockets coact to bring abutment surfaces 44 and 24/25 into engagement.

The locking member 1 is then placed against the upright in the gap 53 with the pin 9 projecting through aperture 55 and is held in place by the magnetic force. Any upward movement of the beams 40 causes the abutment surfaces 54 to abut the locking member which in turn abuts the abutment surface 14 of the louvre preventing further movement and disengagement of the hooks. The locking member may be removed by pressing the pin 9 so that the magnet is forced away from the upright.

I claim:

1. Racking of the type comprising metal uprights having sockets and beams having ends provided with hooks which are adapted to engage said sockets on the uprights wherein a stop is provided on said metal uprights and an abutment surface is provided on said beams and a locking member comprising a magnet positioned and magnetically held in place against said metal upright between said stop on a metal support and said abutment surface of a beam when said hooks of said beam are engaged in said sockets on said metal upright, the locking member having abutment surfaces adapted to bear against said stop and said abutment surface on the beam respectively thereby limiting movement of said beam preventing removal of said hooks from said sockets.

2. Racking according to claim 1 wherein said uprights have a central web and each socket is formed by pressing out a portion of said central web to provide a louvre having a flat face spaced from the plane of said central web and overlying a socket aperture from which the louvre has been removed.

3. Racking according to claim 2 wherein said stop comprises an abutment surface formed at the lower edge of a louvre.

4. Racking according to claim 1 wherein a hook of said beam is provided with an abutment surface for bearing against said locking member.

5. Racking according to claim 1 wherein said locking member comprises a bar magnet.

6. Racking according to claim 1 wherein said locking member comprises a magnet in which the poles are located at its major surfaces.

7. Racking according to claim 1 wherein said locking member comprises a pot magnet.

8. Racking according to claim 7 wherein said locking member has a major surface not in contact with the upright edges bounding said major surface being chamfered or radiused.

9. Racking according to claim 1 wherein said locking member includes a pin projecting from that surface in contact with the upright, and said upright is formed with a portion defining an aperature through which said pin extends.

10. Racking according to claim 9 wherein said pin is made of plastics material.

11. Racking of the type comprising metal uprights having sockets and beams having ends provided with hooks which are adapted to engage said sockets on the uprights wherein said uprights have a central web and each socket is formed by pressing out a portion of said central web to provide a louvre having a flat face spaced from the plane of said central web and overlaying a socket aperture from which the louvre has been removed, the louvre having a lower edge forming a stop, an abutment surface is provided on an upper edge of a hook of said beams and a locking member comprising a magnet positioned and magnetically held in place against said metal upright between said stop on a metal support and said abutment surface of a beam when said hooks of said beam are engaged in said sockets on said metal upright, the locking member having upper and lower abutment surfaces adapted to bear against said stop and said abutment surface on the beam respectively thereby preventing removal of said hooks from said socket.

* * * * *